United States Patent
Field et al.

[11] Patent Number: 5,711,775
[45] Date of Patent: Jan. 27, 1998

[54] SWEEPER WITH ELECTROMAGNETIC FILTER CLEANING

[75] Inventors: Bruce F. Field, Golden Valley; Nilabh Narayan, Plymouth, both of Minn.

[73] Assignee: Tennant Company, Minneapolis, Minn.

[21] Appl. No.: 623,698

[22] Filed: Apr. 15, 1996

[51] Int. Cl.$^6$ ................................ A47L 9/20; B01D 46/04
[52] U.S. Cl. ........................... 55/273; 15/352; 55/284; 55/289; 55/299; 55/300; 55/304
[58] Field of Search ........................ 15/340.1, 352; 55/273, 204, 289, 296, 299, 300, 304; 95/282, 278

[56] References Cited

U.S. PATENT DOCUMENTS

| | | | |
|---|---|---|---|
| 1,986,108 | 1/1935 | Jonsson | 55/289 |
| 3,326,383 | 6/1967 | Pranovi . | |
| 3,504,480 | 4/1970 | Copcutt et al. . | |
| 3,543,483 | 12/1970 | Sheehan . | |
| 3,545,178 | 12/1970 | Sheehan . | |
| 3,591,888 | 7/1971 | Takeda et al. | 15/352 |
| 3,708,962 | 1/1973 | Deguchi et al. | 55/304 |
| 3,778,982 | 12/1973 | Birke | 55/304 |
| 3,938,971 | 2/1976 | McClure . | |
| 4,099,940 | 7/1978 | Mortensen et al. . | |
| 4,258,451 | 3/1981 | Sommerfeld . | |
| 4,345,353 | 8/1982 | Sommerfeld . | |
| 4,787,923 | 11/1988 | Fleigle et al. | 55/304 |
| 5,013,333 | 5/1991 | Beaufoy et al. . | |
| 5,194,077 | 3/1993 | Bargiel et al. . | |
| 5,338,339 | 8/1994 | Westphal | 55/304 |

*Primary Examiner*—C. Scott Bushey
*Attorney, Agent, or Firm*—Dorn, McEachran, Jambor & Keating

[57] ABSTRACT

A sweeping machine includes a housing, wheels for moving the housing and a sweeping brush mounted on the housing. There is a hopper positioned adjacent the brush to receive dust and debris from the rotating brush. A dust collection chamber is located on the housing and a vacuum fan mounted on the housing creates an air flow path from the brush through the hopper into the dust collection chamber. A filter element is positioned in the air flow path with the filter element including a plurality of generally parallel pleats extending in a direction transverse to the air flow path. There is a plurality of electric coils positioned adjacent the pleats. A plurality of metal elements are associated with the pleats. Pulsed electric power is applied to the coils with the electromagnetic fields caused thereby moving the metal elements reciprocally back and forth and the pleats associated therewith to impart a shaking, cleaning movement to the pleats.

35 Claims, 5 Drawing Sheets

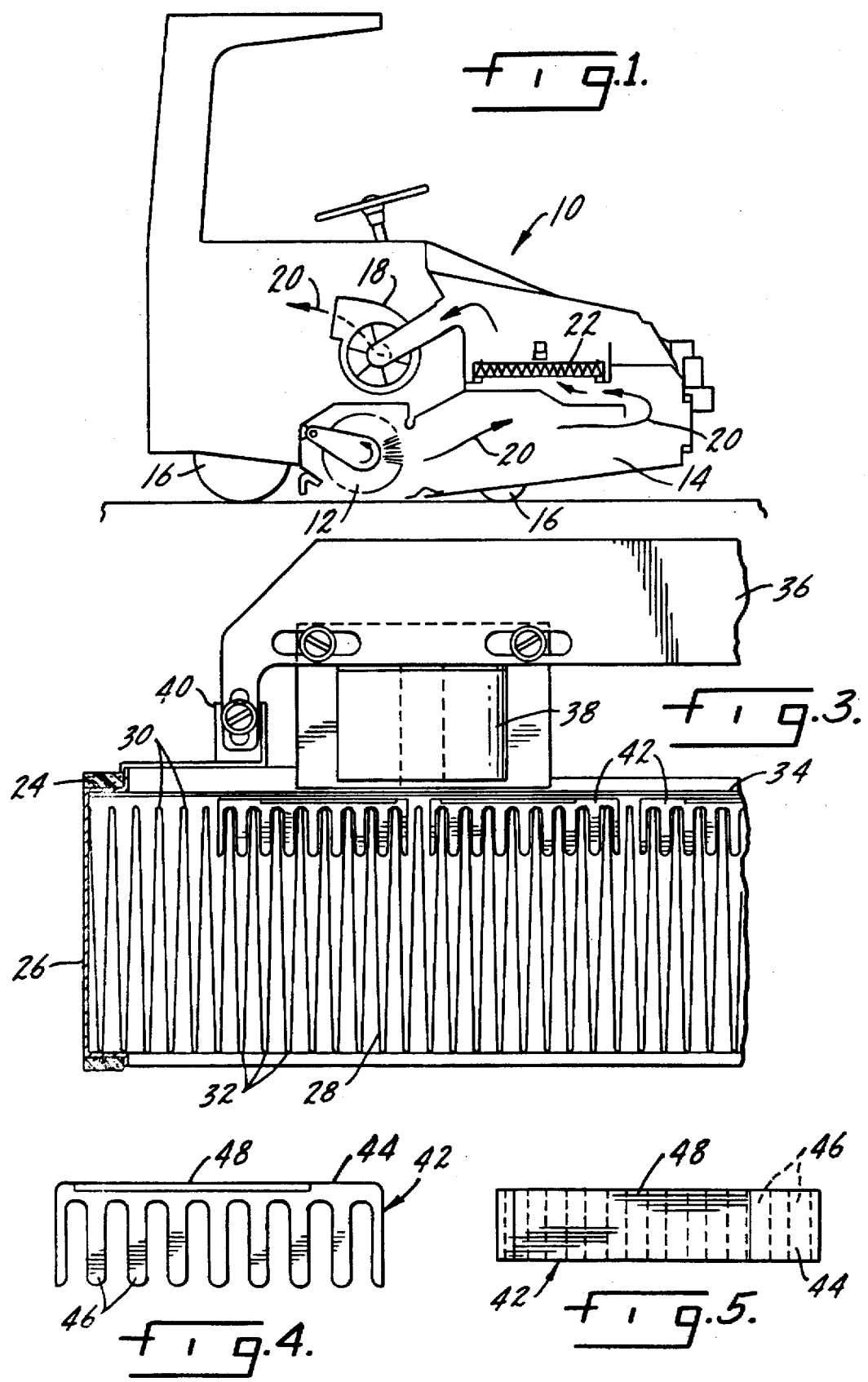

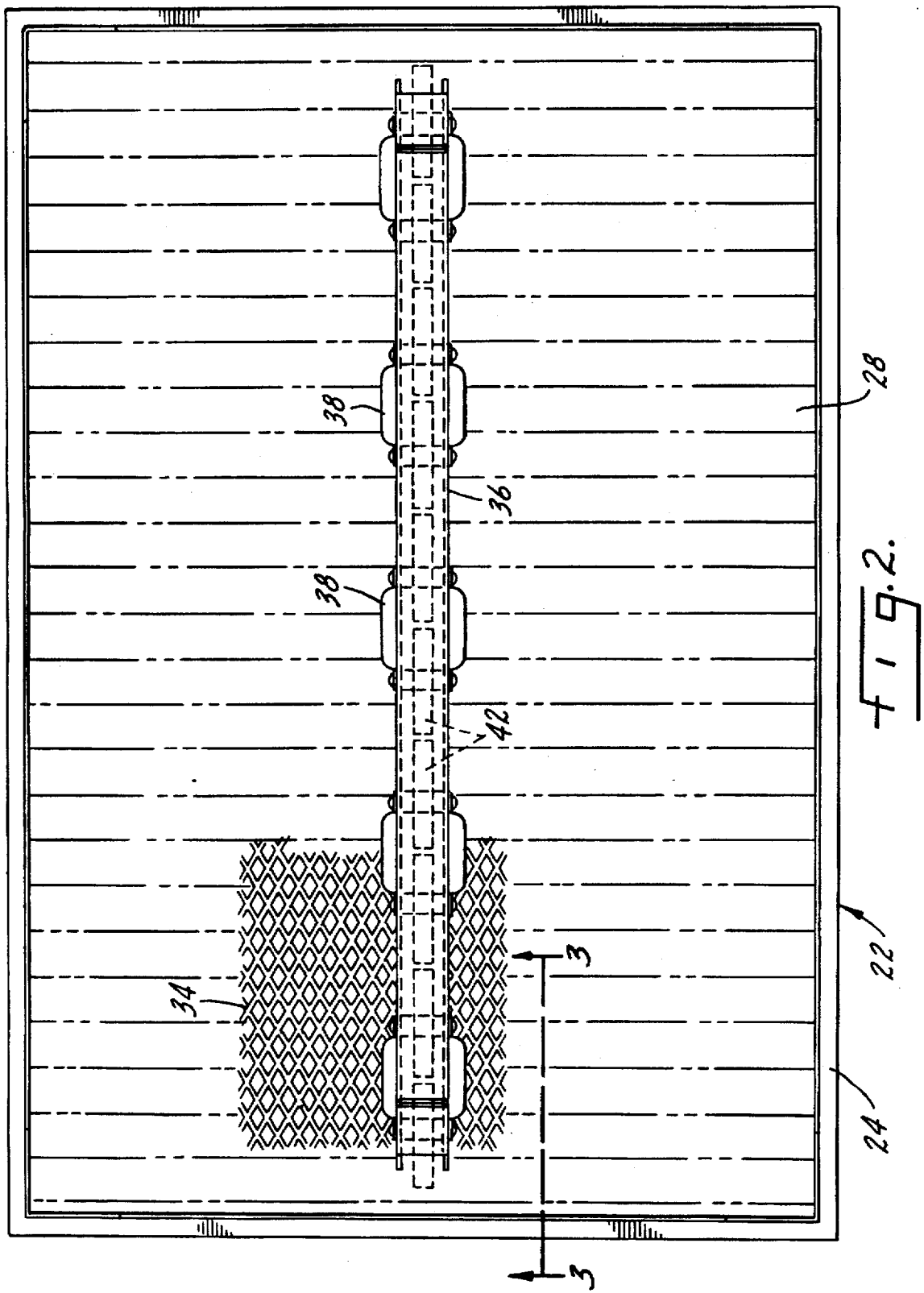

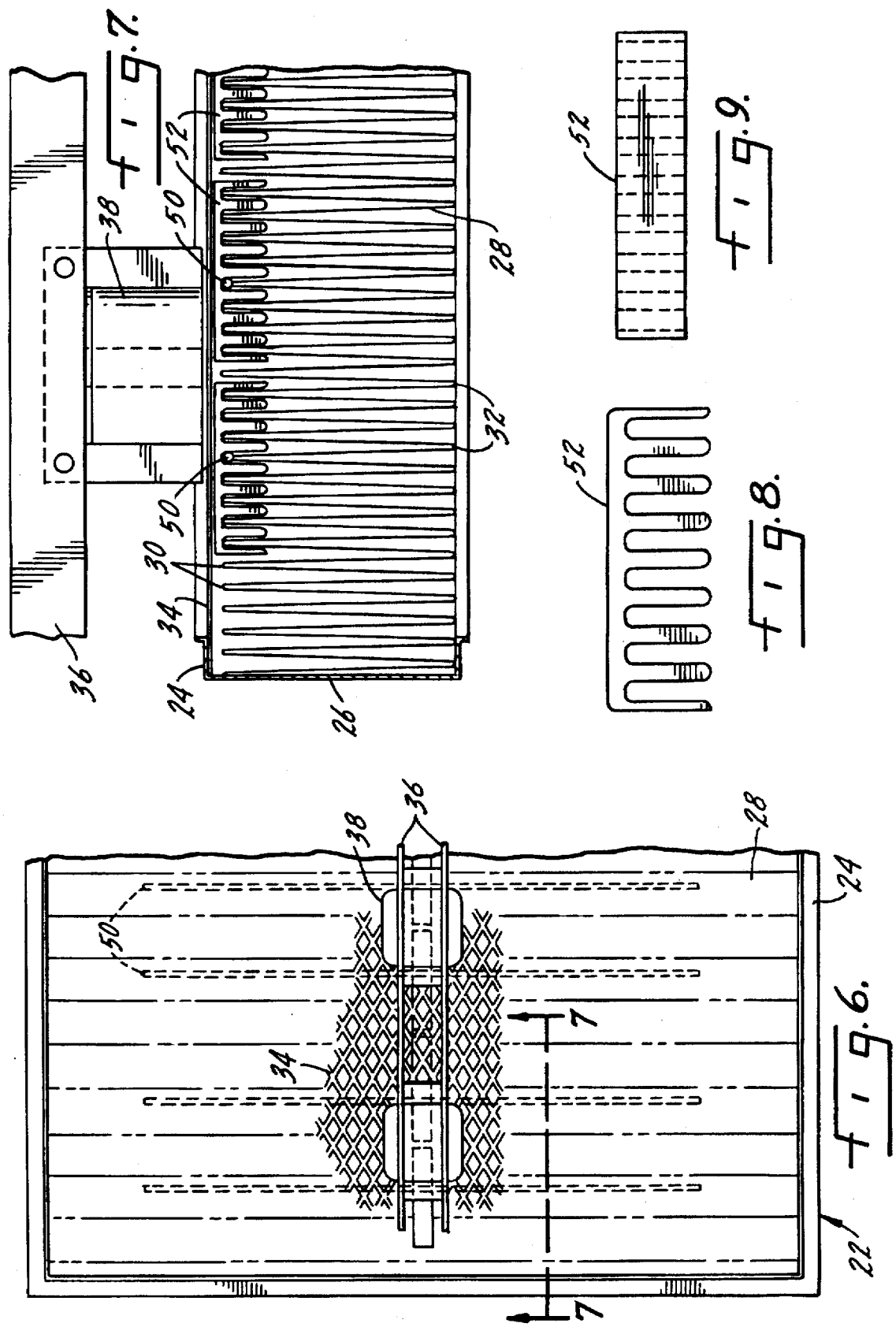

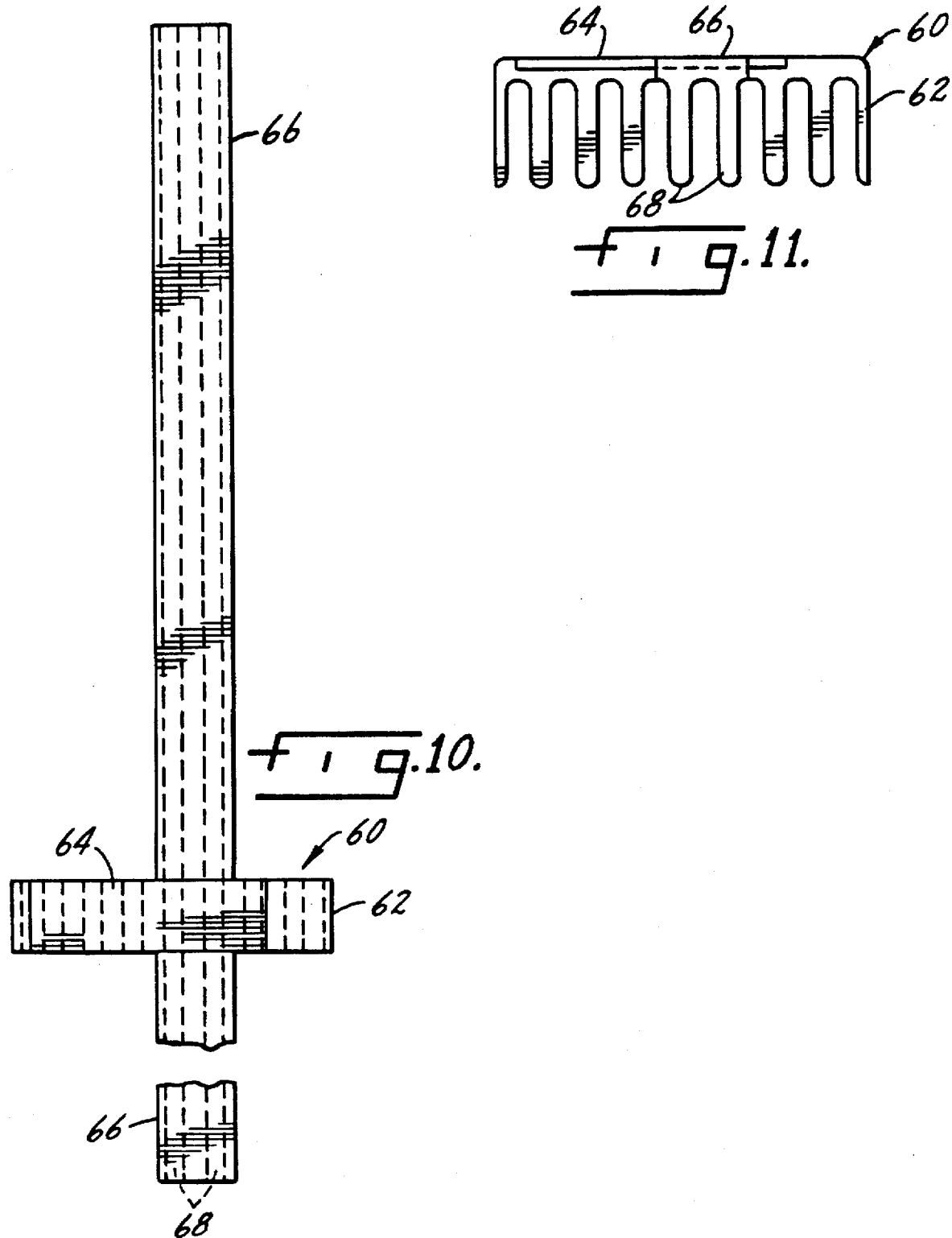

5,711,775

SWEEPER WITH ELECTROMAGNETIC FILTER CLEANING

THE FIELD OF THE INVENTION

The present invention relates to sweeping machines of the type shown generally in U.S. Pat. No. 4,787,923 owned by Tennant Company of Minneapolis, Minn., the assignee of the present application. More particularly, the present invention relates to an improved filter and the means for cleaning the filter.

It is present practice in the sweeping machine art, as shown in the above-mentioned '923 patent, to place a filter in the air flow path of the sweeping machine in such a position that dust is collected below the filter and clean air passes from the filter to the vacuum fan. Such filters are periodically cleaned, again as shown in the '923 patent, by shaker bars. Shaker bars are not particularly effective as a cleaning device and the filter panel is often cleaned inefficiently and inadequately. The present invention provides electromagnetic shaking of the filter media by the placement of one or more small transformers on the top of the filter media and then the use of bars or other types of metal elements, such as rods arranged to cause movement of the filter media. When power is applied to the transformers, the bars or metal elements will move and in one form of the invention the transformers will be pulsed so that the vibration imparted to the bars and thus to the filter pleats very effectively cleans the filters through shaking, causing the dust to fall down into the dust collection chamber. The electro-magnetic filter cleaning of the present invention is essentially noiseless, simple in construction, and utilizes relatively low vibration of the filter media. The entire filter panel may be cleaned, or segments of the panel may be cleaned, either sequentially or alternately. For example, one portion of the panel may be cleaned and the other portion remain operative to pass air through the air flow path in the sweeping machine. In its broadest context, the invention provides electromagnetic cleaning of the filter of a sweeping machine using at least one transformer or solenoid.

In one form of the invention, a plurality of transformers are positioned above a filter panel formed of generally parallel pleats. Portions of the pleats will be connected together into groups by pleat blocks. On the top of each pleat block there is an elongated metal bar. There will be two pleat blocks associated with each transformer and when the transformer is pulsed, the elongated bars will move toward the transformer. The resultant reciprocal movement of the elongated bars and the consequent movement of the pleat blocks and pleats will result in a substantial shaking or vibration of the pleats which will remove the dust which is caked and embedded therein.

Preferably, the transformers will not be operated simultaneously, but will be operated in a predetermined sequence. This reduces the power drain on a machine which often is battery operated. One or more transformers may be pulsed at any one time and the transformers will be pulsed in a predetermined sequence with the result that over a short period of time the entire pleated filter will be cleaned. The time duration of the application of pulsed power can be controlled as can the frequency of pulsed power as well as the intervals between the application of pulsed power.

The application of pulsed power which will draw the pleat blocks toward the transformer has the result of causing the pleats in adjoining pleat blocks to move toward each other and to at least in part contact each other which enhances the vibration imparted to the individuals pleats to assist in the removal of dust and caked debris from the pleated filter element.

SUMMARY OF THE INVENTION

The present invention relates to sweeping machines and in particular to an electromagnetic filter cleaning device for sweeping machines.

A primary purpose of the invention is a filter cleaning device for the use described which utilizes pulsed transformers positioned above the pleated filter with the filter pleats being associated with metal elements which will be moved by the pulsed power in a manner to shake the pleats for cleaning.

Another purpose is a filter cleaning system as described in which the sequence of transformer activation is controlled to reduce power drain.

Another purpose is a filter cleaning system as described in which the time duration and frequency of transformer operation is controlled to maximize filter cleaning.

Other purposes will appear in the ensuing specification, drawings and claims,

BRIEF DESCRIPTION OF THE DRAWINGS

The invention is illustrated diagrammatically in the following drawings wherein:

FIG. 1 is a diagrammatical illustration of a sweeper of the type using the cleaning system disclosed herein;

FIG. 2 is a top plan view of the filter element illustrating the electromagnetic shaker devices applied thereto;

FIG. 3 is a section along plane 3—3 of FIG. 2;

FIG. 4 is a side view of a pleat block;

FIG. 5 is a top view of a pleat block;

FIG. 6 is a partial top plan view of a modified form of electromagnetic shaker system;

FIG. 7 is a section along plane 7—7 of FIG. 6;

FIG. 8 is a side view of the pleat block of the FIGS. 6 and 7 embodiment;

FIG. 9 is a top view of the pleat block of FIG. 8;

FIG. 10 is a top plan view of a modified form of pleat block;

FIG. 11 is a side view of the pleat block of FIG. 10; and

DESCRIPTION OF THE PREFERRED EMBODIMENT

Figure 12:
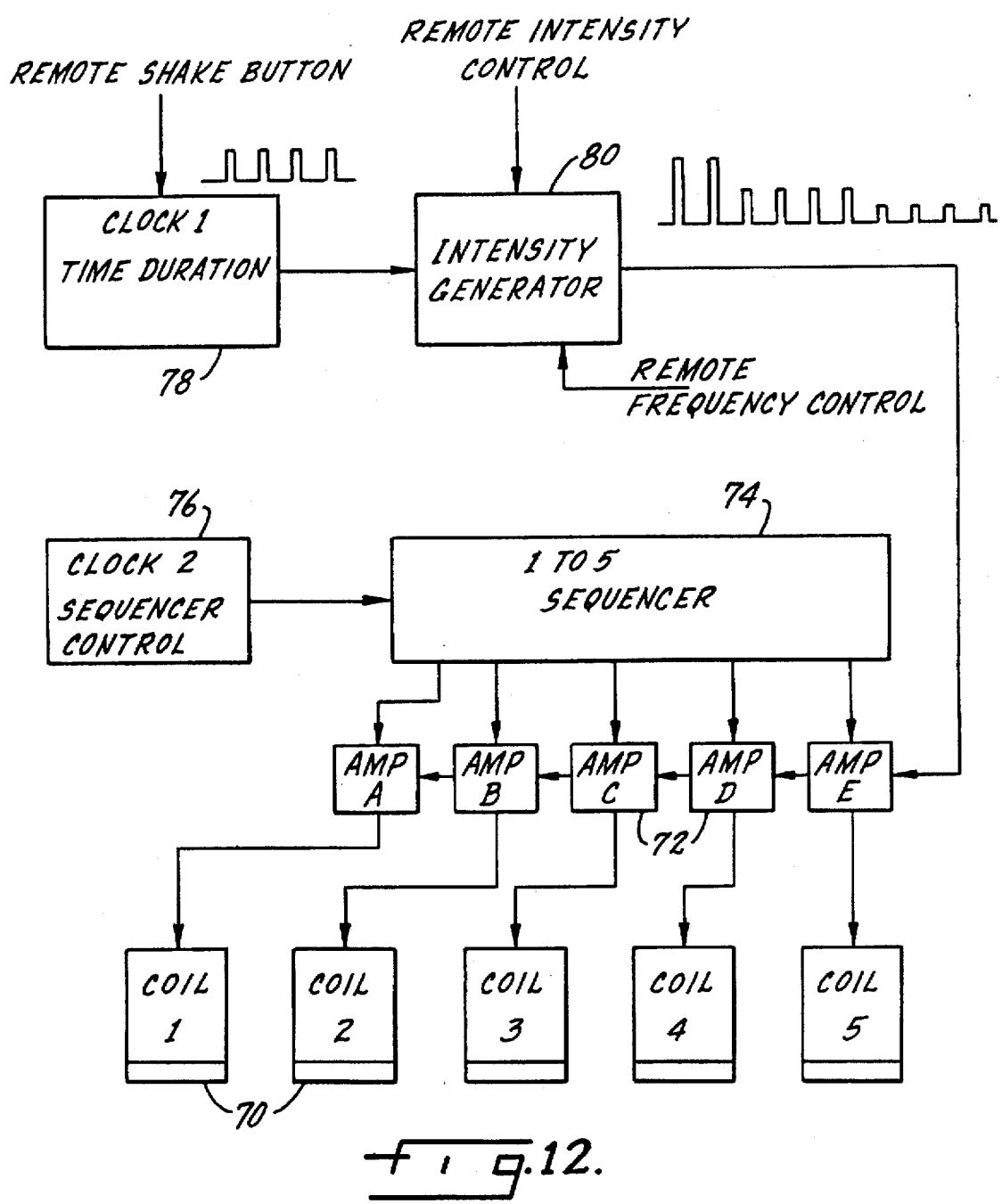
FIG. 12 is an electrical schematic of the control system for the electromagnetic shaker devices illustrated herein.

In FIG. 1 a typical street sweeper of the type illustrated in U.S. Pat. No. 4,787,923, owned by Tennant Company of Minneapolis, Minn., the assignee of the present application is indicated at 10. The sweeper 10 has a brush 12 which directs dust and debris into a hopper 14. Wheels 16 support the sweeper 10. There is a vacuum fan 18 which creates an airflow path in the direction of arrows 20. Positioned within the airflow path is a filter 22 which is illustrated in detail in the following Figs.

As shown particularly in FIGS. 2 through 5, the filter 22 has a peripheral frame 24 which includes side walls 26. Within the confines of the side walls 26 is a pleated filter element 28 which has upper folds 30 and lower or bottom folds 32. The filter element may be conventional and may be formed of paper, or synthetic materials as use dictates. The top of the filter 22 include an aluminum mesh cover 34.

Mounted on top of the filter 22 is a transformer assembly which includes a support bar 36 to which are mounted a plurality of transformers or electric coils 38. The ends of the support bar 36 may be supported by brackets 40 as particularly shown in FIG. 3.

As illustrated in FIG. 2 there are five transformers which may be satisfactory for a 20 inch by 30 inch filter panel. The number of transformers is not essential and may be dictated by the size of the panel. Four transformers may be satisfactory for the same size panel and the number of transformers will in part be dictated by the power and frequency at which the transformers are operated.

As shown in FIG. 3 the pleats 28 may in part be separated into groups and joined together by pleat blocks 42. The pleat blocks 42 which may be formed of a suitable plastic and which have the appearance of a comb have a top surface 44 and a plurality of downwardly extending projections 46 which extend between adjacent pleats with the top folds 30 of the pleats within a group joined by a pleat block extending into the space between the projections 46. There are two groups of pleats joined by pleat blocks positioned adjacent each transformer 38. The adjoining pleat blocks are slightly separated directly beneath the coil of the transformer. Each pleat block 42 carries an elongated metal bar 48 embedded into its upper surface with the bars extending for a substantial portion of the width of the pleat block, although this is not necessary. By separating the pleats into groups and by having the groups positioned to be operatively located next to each transformer there is provided an arrangement of pleat blocks with the most efficient means of cleaning the dirt and caked dust from the pleats.

When each of the transformers is activated by a pulse of electric power, there will be an electromagnetic field formed thereabout. The field will draw the elongated bars 48 towards the center of the transformer. Such movement of the bars will cause concurrent movement of the pleat blocks with the result that the pleats joined by the pleat block will simultaneously move with it. Back and forth movement of adjacent pleat blocks will not only cause vibration of the pleats, but will cause the pleat blocks to contact each other, causing a further impact and shaking of the pleats. Since it is desirable to pulse the transformers, rather than having continuously applied power for every pulse applied to the transformer, the pleat blocks associated with that transformer will move toward each other, and when the power is removed, the pleat blocks will return, because of the inherent resilience of the pleats, back to their at rest position shown in FIG. 3. Thus, the application of pulsed power will cause a vibration or reciprocal movement of the pleat blocks and the pleats joined together by the pleat blocks. This rapid back and forth movement, provided at intervals determined by the control circuit described hereinafter, will cause a shaking or vibration of the pleat blocks to the end that the pleats will be rapidly moved to the point where the dust which has been accumulated on the pleats will be shaken and will fall into the dust collection chamber directly beneath the filter.

The FIG. 2 through 5 embodiment of the invention uses elongated bars extending transversely to the direction of the pleats to react to the electromagnetic fields created by the pulses of power applied to the transformers. The FIGS. 6-9 embodiment of the invention again uses elongated metal elements, but in a different orientation. As particularly shown in FIGS. 6-7, there is an elongated rod or wire 50 embedded in the top fold 30 of one of the pleats joined by the pleat block 52. The rod or wire 50 extends generally substantially the entire length of the pleats as shown in FIG. 6. The wires or rods are metal and will be responsive to an electromagnetic field created by pulsed power applied to the transformer. Again, there are two groups of pleats associated with each transformer and there is a single elongated element located in each pleat block.

In the FIGS. 6-9 embodiment the rods extend parallel to the pleats and will be moved by the application of an electromagnetic field from the transformer. The rods will move towards the center of the transformer and in so doing will move the pleat blocks back and forth in the same manner as the pleat blocks move in the FIGS. 2-5 embodiment. The pleat blocs indicated in FIGS. 8 and 9 are similar to the blocks indicated 4-5 except there is no elongated metal bar embedded into the surface. Again, movement of the pleat blocks results from the use of elongated rods which will move towards the center line of the transformer when pulsed power is applied to it. The movement of the pleat blocks in both embodiments will be substantially the same.

In FIGS. 10 and 11 there is a modified form of pleat block. In this case the pleat block indicated generally at 60 has a comb 62 with a metal bar 64 embedded in the surface thereof. To this extent it is similar to the pleat block shown in FIGS. 4 and 5. Joined to the comb 62 is an elongated carrier 66 which has downwardly extending projections 68 as shown in FIG. 11 and which will sit atop two adjoining pleats. Thus, reciprocal movement of the pleat block toward and away from the transformer, as described in connection with the FIGS. 2 through 5 embodiment will now result in such transverse movement being applied entirely over the length of the pleats in the group. There is no longer reliance just upon movement of the comb which has limited width, but the carrier 66 will insure that the movement applied to the pleats will extend over the entire length of the pleats within the group.

FIG. 12 illustrates the control circuit for all of the previously described embodiments. The transformer coils are indicated at 70 and are designated as coils 1 through 5. Again the number of coils may vary and is not critical to the invention. There are a series of amplifiers 72, there being one amplifier for each coil. The amplifiers are connected to a sequencer 74 with the sequencer being controlled by a clock 76. The clock 76 and sequencer 74 will determine which coils are operated and in what sequence. For example, it may be desirable to operate a single transformer or coil at a time and with the coils being powered up in a particular sequence, depending upon their placement over the filter element, to achieve the most efficient cleaning effect. It is also within the scope of the invention to have more than one transformer operated at any one time. For example, two coils may be powered up at one time or the coils may be powered up in a manner so that a single coil is on and before it has been turned off a second coil is powered and a third coil is powered before the second coil is turned on. Any desired sequence is within the scope of the invention. What is important is that the power be applied in the form of pulses and that less than all of the coils be powered at any one time so as to avoid an excessive power drain on the sweeping machine power supply which is conventionally a battery.

There is a second clock indicated at 78 and labeled clock number one which determines the time duration of the applied pulses. This clock is activated by the operator through the remote shake button and will initiate a cleaning operation. The output from clock number one, indicated at 78, is a series of pulses with the clock controlling the period of the pulse and thus the time between successive pulses. This series of pulses goes to an intensity generator 80 which has a remote intensity control and a remote frequency control. The output from the intensity generator is a series of pulses, at a frequency and intensity determined by the operator. The intensity, or the amplitude of the pulses will control the electromagnetic field created by each transformer. The pulses from intensity generator 80 are connected to the amplifiers 72 designated as amplifiers A through E. There is an amplifier for each coil. The result of the circuit shown is to provide pulses, at a desired frequency and a desired amplitude and with a predetermined duration between pulses to the amplifiers which will be activated in the desired sequence by clock number 2 to control the power applied to the coils 70.

A 30 hZ frequency for the application of the pulses has been determined to provide efficient cleaning. The sequencer may be set to provide two seconds for each cleaning segment whether it be a single transformer or more than one transformer. During the cleaning cycle an efficient mode of operation is to have the transformers be on 30% of the time and off 70% of the time. Although the invention should not be limited to these specific parameters, such have been found to provide effective cleaning.

Whereas the preferred form of the invention has been shown and described herein, it should be realized that there may be many modifications, substitutions and alterations thereto.

The embodiments of the invention in which an exclusive property or privilege is claimed are defined as follows:

1. A sweeping machine including a housing, wheels for moving the housing, a sweeping brush mounted on the housing, a hopper positioned adjacent the brush to receive dust and debris therefrom, a dust collection chamber on the housing, a vacuum fan mounted on the housing and creating an air flow path from the brush through the hopper and to the dust collection chamber, a filter element in said air flow path, said filter element including a plurality of generally parallel pleats extending in a direction transverse to the air flow path, a plurality of electric coils positioned adjacent said pleats, a plurality of metal elements associated with said pleats, and means for applying pulsed electric power to said electric coils, with the electromagnetic fields caused thereby moving said metal elements and the pleats associated therewith to impart a shaking cleaning movement to said pleats.

2. The sweeping machine of claim 1 wherein at least some of the filter pleats are divided into groups, with each group being associated with one electric coil.

3. The sweeping machine of claim 2 including means for joining together the pleats in a group.

4. The sweeping machine of claim 3 wherein the means for joining pleats in a group carries one of the plurality of metal elements.

5. The sweeping machine of claim 4 wherein the pleats have upper and lower folds, with the means for joining together pleats in a group engaging the upper folds of the pleats in a group.

6. The sweeping machine of claim 5 wherein the means for joining a group of pleats includes a comb having an upper surface and downwardly projecting comb elements, with the comb elements being positioned between adjacent pleats.

7. The sweeping machine of claim 5 wherein each of said metal elements extends in a direction transverse to the pleat folds.

8. The sweeping machine of claim 7 wherein said metal elements move toward and away from the coils, when pulsed electric power is applied to said coils to cause movement of the pleats in a group associated with a particular metal element.

9. The sweeping machine of claim 2 wherein there are two groups of pleats associated with each coil, one group on each side of the coil, with application of pulsed power moving the pleat groups toward each other.

10. The sweeping machine of claim 2 including means for joining pleats in a group, which means includes a first element seated on upper folds of pleats in a group and extending transverse to the upper folds, and a second element, attached to the first element and extending parallel to the upper folds of pleats in a group, each of said first elements carrying one of the plurality of metal elements.

11. The sweeping machine of claim 2 wherein said pleats each have spaced parallel upper and lower folds, elongated wire element associated with certain of the pleat upper folds, with said wire elements being moved and causing movement of pleats in a group responsive to the application of pulsed electric power to said coils.

12. The sweeping machine of claim 11 wherein said elongated wires are formed of metal and are the metal elements associated with the pleats.

13. The sweeping machine of claim 1 wherein the means for applying pulsed electric power to said coil includes means limiting the simultaneous application of power to less than all of said coils.

14. The sweeping machine of claim 13 wherein the means for applying pulsed electric power includes circuit means for applying power to said coils in a predetermined sequence.

15. The sweeping machine of claim 14 wherein the means for applying pulsed electric power includes circuit means limiting the application of pulsed electric power to each coil for a predetermined period of time.

16. The sweeping machine of claim 13 wherein said means for applying pulsed electric power include means for varying the intensity of the applied power.

17. The sweeping machine of claim 13 wherein the means for applying pulsed electric power include means for varying the frequency of the applied power.

18. A pleated air filter and means for cleaning it, said filter including a frame, a plurality of generally parallel pleats mounted in said frame, said pleats each having spaced parallel upper and lower folds, an elongated metal element associated with certain of the pleat upper folds, at least one electric coil mounted on said frame above the pleat upper folds, means for applying pulsed electric power to said at least one coil to create art electromagnetic field thereby, which pulsed electromagnetic field causes reciprocal movement of said metal element in a direction transverse to said generally parallel pleats to impart a shaking, cleaning movement to said pleats.

19. The filter of claim 18 wherein the elongated metal element extends parallel to the pleat upper folds.

20. The filter of claim 19 wherein said elongated metal element is a wire attached to a pleat upper fold.

21. The filter of claim 18 wherein said elongated metal element extends transverse to the pleat upper folds and is moved toward and away from the electric coil by the pulsed electric power applied thereto.

22. The filter of claim 18 wherein said pleats are divided into groups, there being one coil associated with each group of pleats.

23. The filter of claim 22 wherein at least a portion of the pleats in each group are joined together along upper folds thereof by a pleat block, movement of an elongated metal element in a direction transverse to the generally parallel pleats causing movement of the associated pleat block and the pleats joined thereto.

24. The filter of claim 23 wherein there is an elongated metal element associated with each pleat block.

25. The filter of claim 23 wherein there are a plurality of electric coils, there being two pleat blocks associated with each coil, with the pleat blocks being generally disposed on each side of the center of the coil.

26. The filter of claim 25 wherein there is an elongated metal element associated with each pleat block.

27. The filter of claim 26 wherein said elongated metal elements are attached to the upper surface of a pleat block and extend in a direction transverse to the generally parallel pleats.

28. The filter of claim 23 wherein said pleat blocks extend in a direction transverse to the generally parallel pleats.

29. The filter of claim 28 wherein each pleat block includes a portion extending generally parallel to said generally parallel pleats and along the upper surface thereof.

30. The filter of claim 18 wherein there are a plurality of electric coils, and wherein the means for applying pulsed electric power to said coils includes means for limiting the simultaneous application of power to less than all of said coils.

31. The filter of claim 30 wherein the means for applying pulsed electric power include circuit means for applying power to said coils in a predetermined sequence.

32. The filter of claim 30 wherein the means for applying power include circuit means limiting the application of pulsed electric power to each coil for a predetermined period of time.

33. The filter of claim 30 wherein the means for applying pulsed electric power include means for varying the intensity of the applied pulsed power.

34. The filter of claim 30 wherein the means for applying power includes circuit means for varying the frequency of the applied power.

35. A sweeping machine including a housing, wheels for moving the housing, a sweeping brush mounted on the housing, a hopper positioned adjacent the brush to receive dust and debris therefrom, a dust collection chamber on the housing, a vacuum fan mounted on the housing and creating an air flow path from the brush through the hopper and to the dust collection chamber, a filter element in said air flow path, said filter element including a plurality of generally parallel pleats extending in a direction transverse to the air flow path, at least one electric coil positioned adjacent said pleats, at least one metal element associated with said pleats, and means for applying electric power to said at least one coil, with the electromagnetic field caused thereby moving said at least one metal element and the pleats associated therewith to impart a shaking cleaning movement to said pleats.

* * * * *